Figure 1:
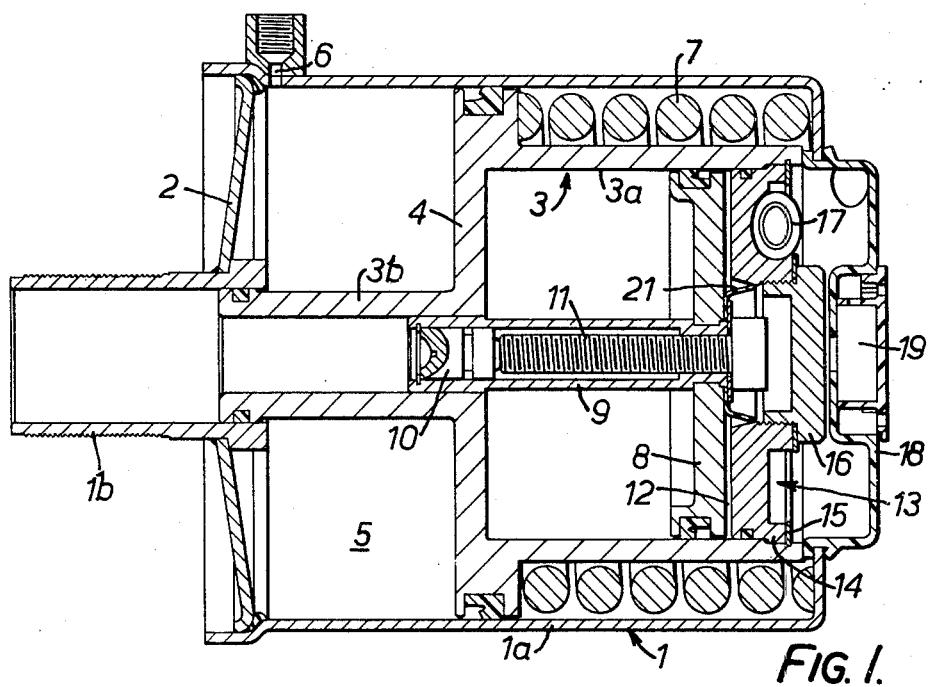

United States Patent [19]
Wright

[11] 3,885,458
[45] May 27, 1975

[54] VEHICLE WHEEL BRAKE ACTUATORS

[75] Inventor: Andrew Charles Walden Wright, Birmingham, England

[73] Assignee: Girling Limited, Birmingham, England

[22] Filed: Nov. 26, 1973

[21] Appl. No.: 418,919

[30] Foreign Application Priority Data
Nov. 28, 1972 United Kingdom............... 55012/72

[52] U.S. Cl. ........................ 92/52; 92/65; 92/114; 92/129; 92/130
[51] Int. Cl. .......................................... F01b 7/20
[58] Field of Search .............. 92/61, 62, 63, 64, 65, 92/66, 52, 113, 114, 129, 130

[56] References Cited
UNITED STATES PATENTS

| | | | |
|---|---|---|---|
| 3,151,530 | 10/1964 | Brown............................. | 92/130 X |
| 3,158,069 | 11/1964 | Edwards et al. ................... | 92/63 X |
| 3,176,594 | 4/1965 | Cruse.................................. | 92/63 X |
| 3,181,433 | 5/1965 | Cruse.................................. | 92/63 X |
| 3,188,916 | 6/1965 | Beatty............................... | 92/63 X |
| 3,295,422 | 1/1967 | Bostwick.......................... | 92/128 X |
| 3,485,537 | 12/1969 | Schlor et al...................... | 92/63 X |
| 3,508,469 | 4/1970 | Williams............................ | 92/64 X |
| 3,563,139 | 2/1971 | Page et al. ........................ | 92/130 X |
| 3,576,152 | 4/1971 | Chevreux.............................. | 92/65 |
| 3,590,693 | 7/1971 | Rasko .................................. | 92/64 |

*Primary Examiner*—Irwin C. Cohen
*Assistant Examiner*—Abraham Hershkovitz
*Attorney, Agent, or Firm*—Scrivener Parker Scrivener and Clarke

[57] ABSTRACT

A spring actuator for a vehicle wheel brake comprises a service brake piston and cylinder, a brake operating device connected to the service brake piston arranged to transfer braking forces from the piston to the wheel brake, and a spring actuated parking or emergency braking piston and cylinder, the emergency braking piston normally being held off by fluid pressure, and being movable under the spring bias upon release of the pressure to engage the service brake piston to transfer whereby the spring forces are transferred to the wheel brake. The brake operating device includes a release member releasably connected to the service brake piston and axially movable relative thereto to release the braking forces.

7 Claims, 2 Drawing Figures

VEHICLE WHEEL BRAKE ACTUATORS

This invention relates to vehicle wheel brake actuators.

A known form of brake actuator comprises a diaphragm movable in a first cylinder and operative when fluid pressure is applied thereto to actuate a vehicle wheel brake for service brake operation, and a piston for emergency braking or parking carrying a push rod and movable in a second cylinder from a normal operative position, in which fluid pressure is applied thereto to hold off the piston against a spring bias, to a brake actuating position, in which the fluid pressure is released and the piston is moved under the spring bias and the push rod engages the diaphragm to move the latter to actuate the brake. Such brake actuators have a release means connected directly to the emergency braking piston and co-operable with the push rod, the release means being movable relative to the piston to permit movement of the diaphragm from its brake actuating position in the event of pressure failure.

The above-described brake actuator has the disadvantage of the release means being connected directly to the emergency braking portion and acting on the diaphragm through the intermediary of the push rod, which adds to the overall length.

The present invention aims at overcoming the disadvantage and provides a vehicle wheel brake actuator comprising a first fluid pressure operable member working in a first cylinder and biased by resilient biasing means towards a brake actuating position for emergency braking or parking and normally held off by fluid pressure opposing the resilient bias, a second fluid pressure operable member working in a second cylinder and movable between a normal and a brake actuating position for service braking, and brake operating means coupled to the second member and movable therewith in the brake actuating direction for transferring braking forces, in use, to the wheel brake, the first fluid pressure operable member being engageable with the second fluid pressure operable member so that when the first member is relieved of pressure the resilient biassing force is transferred through the second member to move the latter to its brake actuating position, wherein the brake operating means comprises release means releasably connected to the second member and movable axially relative thereto to release the braking forces.

Figure 2:
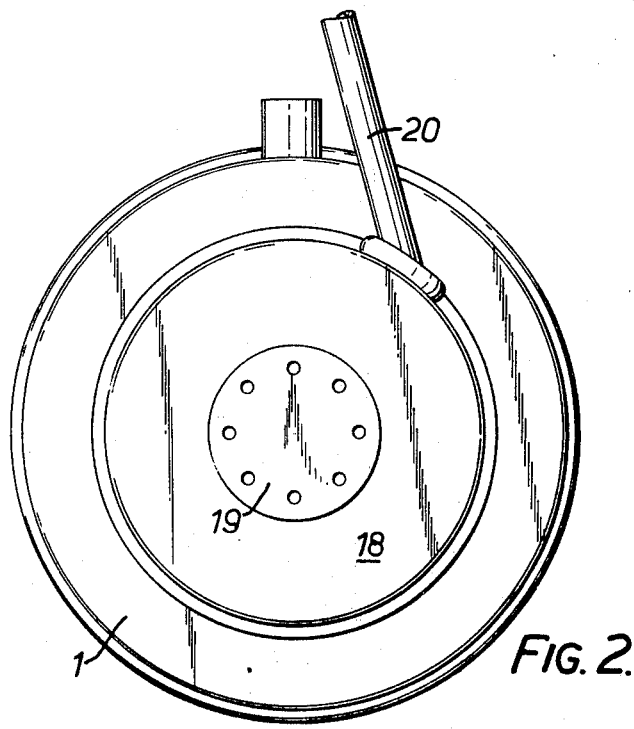

A vehicle wheel brake actuator will now be described, by way of example, with reference to the accompanying drawings, in which:

FIG. 1 is a cross sectional view of the actuator, and
FIG. 2 is an end view of the actuator.

The actuator comprises a main, outer housing 1 having a larger cylindrical part 1a and a smaller cylindrical part 1b extending from an annular end wall 2 of the housing. A first fluid pressure operable member in the form of an emergency braking or parking piston 3 is sealingly slidable in the outer housing 1 and comprises a piston part 4, a larger cylindrical part 3a extending axially rearwardly of the piston part 4 and a smaller cylindrical part 3b extending axially forwardly of the piston part 4. The piston part 4 and the smaller cylindrical part 3b are sealingly supported in the respective outer housing parts 1a and 1b. A chamber 5 is defined forwardly of piston part 4 and is connected through a port 6 to a fluid pressure supply source (not shown). When fluid pressure is applied to chamber 5, the piston 3 is held to the right as seen in FIG. 1 against the bias of a coil compression spring 7.

A second fluid pressure operable member in the form of a piston 8 is sealingly slidable within the larger cylindrical part 3a and carries an elongated cylindrical sleeve member 9 which is slidingly supported in the smaller part 3b of the piston 3. An output piston 10 is slidably supported within the member 9 and is arranged to engage at one end a push rod (not shown) of a brake actuating mechanism, which may, for example, be a wedge-type brake shoe expander, and at the other end a release means in the form of a releasing bolt 11 screw threadedly connected to the sleeve member 9.

The piston 8 forms one wall of a service brake chamber 12 the other wall of which is formed by an end wall assembly 13 connected to the end of the cylindrical part 3a, which comprises a wall member 14 secured to the larger part 3a by a circlip 15 and a plug 16 which is screw-threadedly connected to a central spring in the wall member 14. A port (not shown) in the end wall member 14 opens out into the chamber 12 and is connected to the fluid pressure source through a flexible tubing 20 (not shown in FIG. 1) at 17.

To prevent the ingress of dirt, the actuator is sealed by an end cap 18 having a filter 19, and to prevent the dirt from entering the chamber 12 when the end cap 18 and the plug 16 are removed and the piston 8 is in the position shown in FIG. 1, a dished seal 21 is supported between the piston 8 and releasing bolt 11.

The operation of the brake actuator will now be described. The actuator is illustrated in its normal operating condition in which the brake is not applied, the chamber 5 being pressurised to hold off the piston 3, and the chamber 12 being unpressurised. In normal service brake operation, pressure is applied to chamber 12 to move the piston 8, member 9, releasing bolt 11 and output piston 10, to the left to apply the brake; release of pressure in the chamber allows the piston assembly to move to its initial position under the bias of the brake mechanism.

If there is a release of pressure from the system, the piston 8 is inoperative and pressure is released from the chamber 5. The piston 3 then moves to the left under the force of spring 7 and movement of the end wall 13 causes corresponding movement of the service brake piston 8 to apply the brake. The release of pressure may be due to a failure, in which case the actuator effects emergency braking, or it may be caused manually to apply the brake for parking. In the case of failure, the brake may be released manually by removing the end cap 18 and plug 16 to allow access to the releasing bolt 11. Unscrewing of the releasing bolt will then allow the piston 10 to slide in the member 9 to release the brake.

It will be seen that the release bolt is connected to the service brake piston 8 and acts as a force transmitting member to transfer the braking forces from piston 8 to the brake actuating mechanism. Further, the piston 8 is slidable within the cylinder 3a forming part of the piston 3. Thus, the axial length of the above-described actuator, including its release means, is reduced as compared with known actuators.

I claim:

1. A vehicle wheel brake actuator comprising a first cylinder, a first fluid pressure operable member working in said first cylinder, resilient biasing means biasing said first member towards an actuating position, said first member being normally held off by fluid pressure opposing said biasing means, a second cylinder, a second fluid pressure operable member working in said second cylinder and movable between a normal position and an actuating position, output means, means releasably connecting the output means to said second member and movable therewith for transmitting forces of said second member when said second member travels toward its actuating position, means engaging said first member with said second member to transfer the biasing force of said resilient biasing means through said second member and said releasable connecting means to said output means upon release of said opposing fluid pressure, said connecting means comprising axially movable release means releasably connected to said second member for movement therewith between its normal and actuating positions, said release means being axially movable relative to said second member to release the forces of said biasing means acting on said output means following release of said opposing fluid pressure.

2. A brake actuator according to claim 1, wherein said first member includes a rearwardly axially extending cylindrical part, constituting said second cylinder.

3. A brake actuator according to claim 2, wherein said engaging means comprises a wall assembly connected to the rear end of said rearwardly extending part of said first member, wherein said assembly constitutes an end wall of said second cylinder and is arranged to engage said second member.

4. A brake actuator according to claim 3, wherein said wall assembly includes a removable plug axially aligned with said release means, whereby removal of said plug permits access to said release means.

5. A brake actuator according to claim 1, wherein said second fluid pressure operable member includes a sleeve member having one end secured to said second member, said first fluid operable member further comprising an axially extending cylindrical member and said sleeve member having its other end slidably supported in said cylindrical member and wherein said release means is releasably connected to and axially movable within said sleeve member.

6. A break actuator according to claim 5, wherein said first member includes a forwardly axially extending cylindrical part which constitutes said cylindrical member.

7. A brake actuator according to claim 2 wherein said resilient biasing means comprises a coil spring surrounding the rearwardly axially extending cylindrical part, said second cylinder being entirely within the coils of said spring.

\* \* \* \* \*